Feb. 9, 1943. A. E. OSBORN 2,310,744
PIPE JOINT
Filed April 23, 1941 2 Sheets-Sheet 1
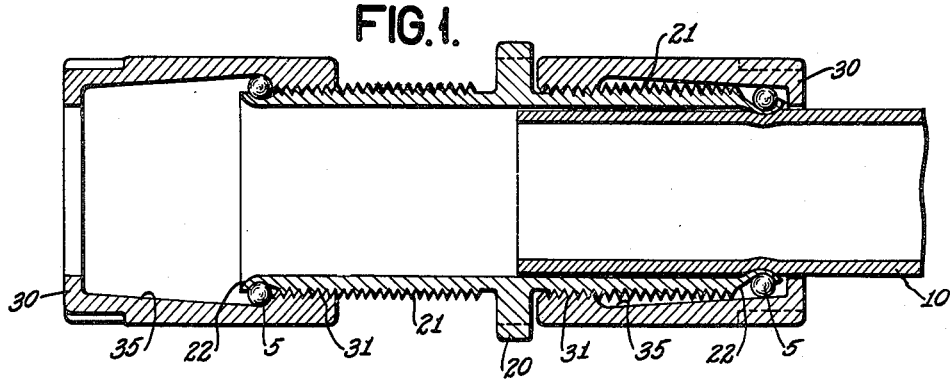
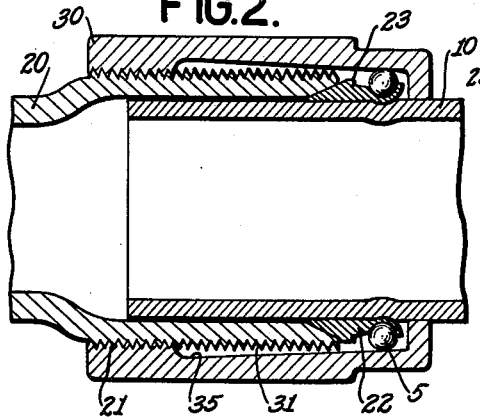
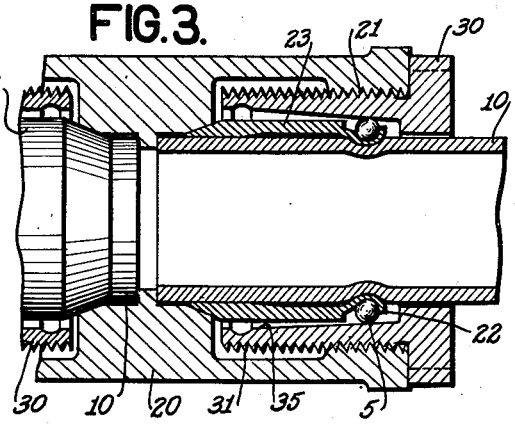
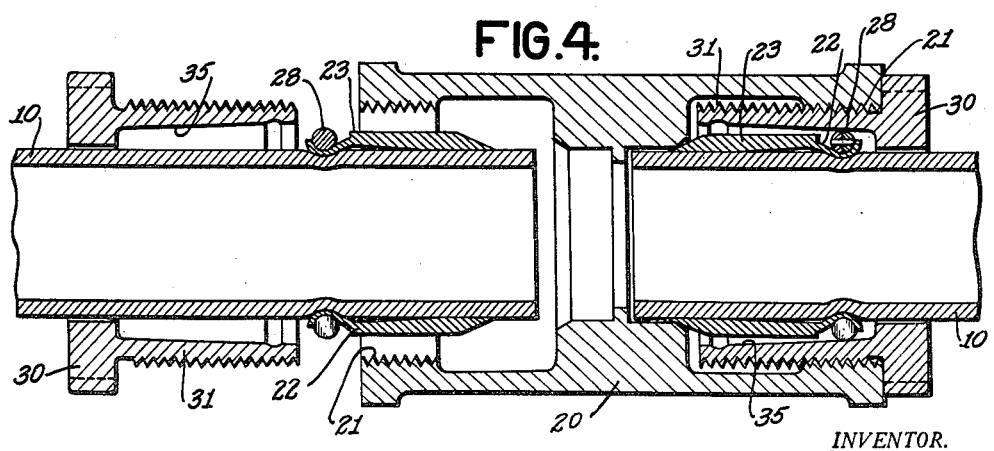
INVENTOR.
Alden E. Osborn

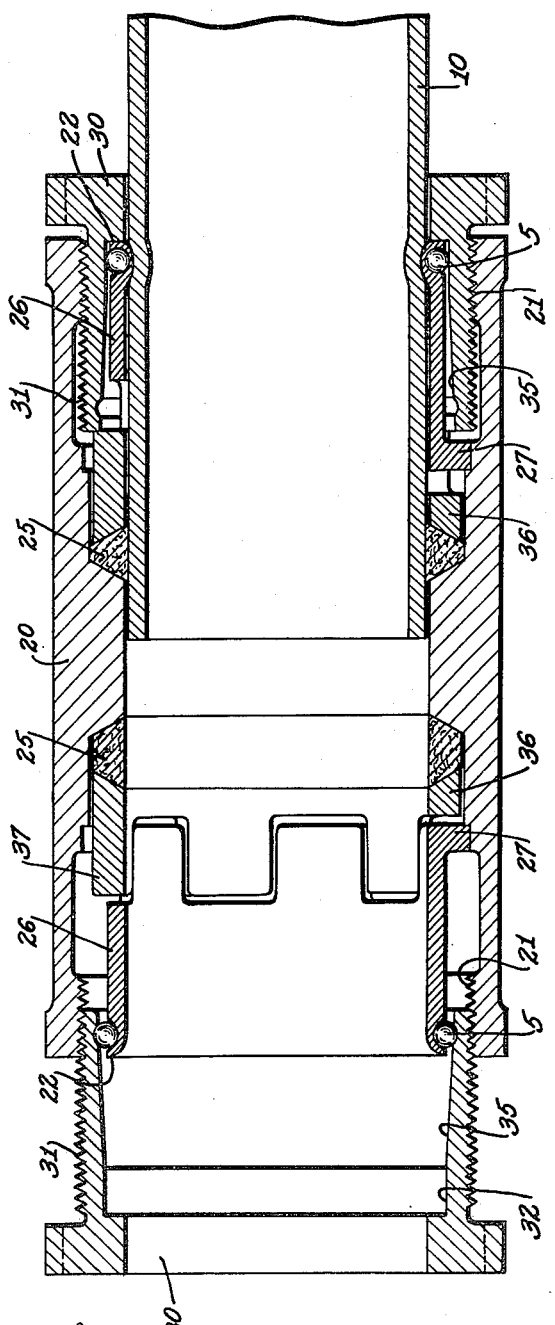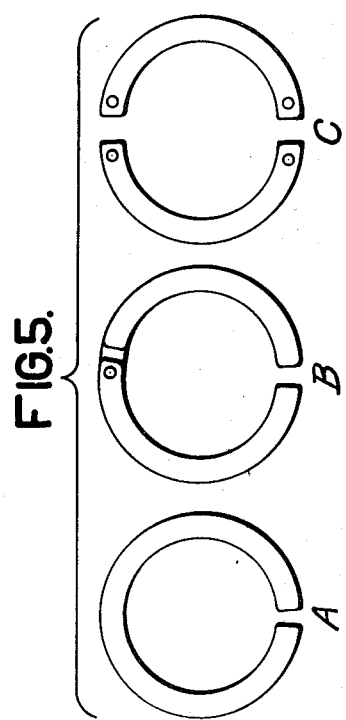

Patented Feb. 9, 1943

2,310,744

UNITED STATES PATENT OFFICE 2,310,744

PIPE JOINT

Alden E. Osborn, Mount Vernon, N. Y.

Application April 23, 1941, Serial No. 389,869

5 Claims. (Cl. 285—97.3)

My invention relates to improvements in the pipe joint shown in my Patent No. 2,219,053, dated October 22, 1940, whereby greater simplicity is obtained and also whereby the pipe joint illustrated in that patent and the improvements disclosed herein can be readily assembled after having been taken apart. While I have disclosed in my Patent No. 2,219,053 a ball-retaining means between the balls and the surface of the pipe, the thin end of the sleeve, hereinafter described and forming a part of my present invention, functions, not only, as a retaining means for the balls before the pipe is inserted, but, in addition, functions as a leak-preventing means when the joint is tightened and is, therefore, an improvement over the device of this patent by eliminating a separate leak-preventing means.

It will also be noted that, altho the claims of Patent No. 2,219,053 broadly cover these roll types of joints, the methods of rendering this type of joint leak-proof disclosed herein differs materially from those of the patent.

In the accompanying drawings:

Figure 1 represents a longitudinal sectional view of my invention in its simplest form, Figure 2 represents a longitudinal sectional view of a modification of Figure 1, Figure 3 represents a longitudinal sectional view of a still further modification, Figure 4 represents a longitudinal sectional view showing the joint of Figure 3 with the recoupling device inserted, Figure 5 represents views of various recoupling devices adapted to the roll joint illustrated herewith and the roll joint of my Patent No. 2,219,053, and Figure 6 represents a still further modification.

In the device of my Patent No. 2,219,053 I employ, to fasten the pipe or cylindrically ended member into the fitting or socketed part, an internally tapered threaded sleeve and balls between the taper of the sleeve and the pipe or cylindrically ended member as illustrated in the device disclosed herein, but I also employed an additional packing and a packing-compressing sleeve actuated by the thrust pressure of the balls to prevent leakage between the parts, whereas, in my present invention, the prevention of leakage is accomplished either by the direct action of the balls on a sleeve without the use of packing or by the compressing of the packing independently of the thrust pressure that is exerted by the balls.

In Figure 1 of the drawings the device is shown in the form of a pipe coupling, one end of which has the parts in the position they assume with the pipe fastened therein, while the other end has the parts in the position they assume before the pipe has been inserted. In the form shown in Figure 1, 20 represents the fitting or main part of the coupling which should be made of a relatively malleable or deformable material for reasons hereinafter explained. This fitting is provided with sockets into which the pipe 10 is fitted and the outer end of the fitting beyond the socket is provided with a thin extension 22 around which the balls 5 are arranged. The fitting is also provided with threads 21 on its external surfaces surrounding the sockets and these threads engage co-acting threads 31 on the interior of the collar 30 which has an internal tapered surface 35 engaging the balls. It will be noted that the thin extension 22 of the end of the fitting is shown, at the end of Figure 1 that does not have the pipe inserted, as being flared outward around the balls 5 so that it acts as a ball retainer altho a separate ball retainer can be provided. In order to fasten this form of fitting 20 to the pipe 10, the pipe is pushed into the fitting socket as far as it will go and the collar 30 is turned to screw it onto the fitting to the maximum extent. The turning of the collar rotates the balls 5 about the pipe 10 and at the same time causes them to contract, because of the internal taper 35 on the collar, about the thin end 22 of the fitting and to roll this thin end of the fitting and the pipe together and form a groove in the pipe to a depth determined by the diameter of the smallest part of the taper 35 on the collar. Thus the pipe is not only held in position by the balls engaging the pipe groove, but the joint between the pipe and the fitting is made tight by reason of the small end of the fitting being rolled into and held into tight contact with the pipe. It will be noted that this form of my device is applicable to uses where a permanent connection is desired, as, if the pipe is withdrawn from the fitting after the joint has been tightened, the thin end of the fitting that had been rolled into the pipe would be destroyed and the fitting would thereafter be unusable.

In the modification shown in Figure 2 I have provided a means whereby the pipe 10 can be withdrawn from the socketed part 20 or fitting (in this form shown as the enlarged end of a second pipe) which comprises forming the part 22 that is rolled into the pipe groove on a ring or sleeve 23 separable from the fitting or socketed part. This ring is bevelled on the end engaging the socketed part 20 so that, while it would form a tight contact with the socketed part and also if desired, be pressed, at that point, into contact with the pipe, it could readily be separated from the socketed part when the joint is taken apart. The method of application and operation of this form of invention is the same as is the case with that just described with the thin end 22 of the ring 23 rolled into tight contact with the pipe instead of the thin end 22 of the fitting so that the ring can thereafter be removed when the pipe is removed without breaking the rolled joint.

In the further modification shown in Figure 3 the separate rolled-in member 23 of Figure 2 is employed but, in this case, it is in the form of a sleeve as it forms a spacer to hold the balls 5 in the desired position as well as to act as a ball-retainer and a means for making the joint leak-proof. This Figure 3 also illustrates a modified arrangement of the fitting or socketed member 20 and the tapered collar 30 in that the thread 21 is inside of the fitting and on the thread 31 outside of the collar. The operation of this form of my invention is exactly the same as the forms shown in the preceding figures and it can be disassembled and re-assembled in the same manner as Figure 2. It will be noted that these forms of my joint can be made entirely of metal, thus eliminating difficulties due to high temperatures, oil, or other substances that might cause the packing to deteriorate.

When taking these roll joints apart with the intention of re-assembling, the pipe 10 can be withdrawn from the socketed member or fitting 20 at the same time the collar 30 is being unscrewed, so that the balls 5 could be prevented from getting out of the groove in the pipe. If the collar 30 is held in position against the balls 5 while the pipe is removed from the socketed member 20 the pipe 10 can again be inserted into the socketed member and re-connected thereto by screwing the collar 30 tightly onto the fitting. In some cases, however, it might be difficult to hold the collar 30 in position against the balls 5 while the pipe 10 is being removed and while it is out of the member 20 and, in Figure 4 I have shown a means for easily re-connecting the pipe if the balls fall out of position and without the need of reinserting the balls. This consists of inserting a ring 28 into the groove of the pipe 10 before the parts are re-connected, as illustrated on one end of Figure 4, so that, when the joint is tightened, as shown at the other end of Figure 4, the ring 28 would be tightly clamped in the pipe groove in place of the balls 5. This ring 28 would preferably be slightly larger in sectional area than the diameter of the balls 5 it replaces, so that the parts would be tightly compressed when the member 30 is tightened. It can be in the form of a split ring (as shown at A—Figure 5) that can be passed over the end of the pipe or, if it is to be used where the ring cannot be passed over the end of the pipe, it could be in parts hinged together (as at B—Figure 5) or in sections with small holes in their ends (as at C—Figure 5) adapted to be fastened together with wire.

In the form of my invention shown in Figure 6 I have provided, in order to prevent leakage thru the joint, a packing 25, but the means for obtaining compressing pressure on this packing is not dependent on the thrust pressure developed on the balls 5, whereas in my Patent No. 2,219,053, the packing pressure was dependent on the thrust pressure due to the action of the collar taper angle 35 on the balls. In Figure 6 the socketed member or fitting 20, into which the pipe 10 is fastened, is formed with an internal thread 21 and the collar 30, having the tapered surface 35, is threaded exteriorly at 31 as in the forms of my invention illustrated in Figures 2, 3 and 4, while a sleeve 26 is provided for properly positioning the balls 5. The sleeve 26 does not, however, engage the fitting thru a tapered leak-proof joint, but contacts with the fitting thru a plurality of projecting fingers 27 that keep the sleeve from longitudinal movement. The sleeve 36 is shown as provided with outwardly projecting fingers 37 that pass between the fingers 27 of the spacing sleeve and are of sufficient thickness to permit the end of the collar 30 to come into contact with them when the collar is being turned to tighten the joint.

The operation of this form of my joint is as follows: When the joint is being tightened by the turning of the collar 30 the balls 5 are rolled into the pipe by the collar taper 35 without any pressure being exerted on the packing 25 until the rolling of the pipe groove is completed or practically completed. At this time the end of the collar 30 comes into contact with the projecting fingers 37 on the ring 36 so that any further turning of the collar 30 puts a direct longitudinal pressure on the ring 36 and packing 25 with the result that, when finally tightened, the parts assume the position in which they are shown in at the pipe 10 end of Figure 6. The pressure on the packing 25 can thus be adjusted without regard to the pressure on, or the position of, the balls 5. This is particularly the case if a flat surface 32, as shown, is arranged at the smallest diameter part of the taper 35, altho a continuous type of internal taper (as shown in Figures 1, 2, 3 and 4) can, of course, be used with this figure, if desired. When this form of my invention, as well as some of the forms of my device shown in Patent No. 2,219,053, are to be re-connected, a new packing 25 may have to be inserted and a ring 28, as shown in Figures 4 and 5, could be used in place of the balls.

It should be understood that, while my invention is particularly applicable to the fastening, with a leak-proof joint, of pipes into fittings of various kinds or to the fastening of pipes together in a manner to prevent leakage thru the joint, it is not limited to these fields, but can be employed to fasten, with a leak-proof joint, any part having a cylindrical end into the socket of another part.

I claim:

1. A means for joining an open-ended member and a member having a cylindrical portion adapted to enter said open-ended member, comprising a relatively thin sleeve around said cylindrical portion of said second-mentioned member, a collar having an internal tapered surface, balls within said collar and arranged to bear upon said tapered surface therein and the exterior of said relatively thin sleeve, and co-acting threads on said open-ended member and said collar whereby, when said collar is rotated to move same longitudinally by the action of said threads, said balls are rotated and moved around and along said internal tapered surface to the smaller diameter part thereof and are also rotated against said relatively thin sleeve to contract said balls about said sleeve and reduce the circumference thereof at the point of contact of said balls and to press said sleeve into forcible contact with said cylindrical portion of said second-mentioned member to thereby hold said open-ended member and said second-mentioned member together and to render the joint between said open-ended member and said second-mentioned member tight against leakage.

2. A means for joining an open-ended member and a member having a cylindrical portion adapted to enter said open-ended member, comprising a sleeve surrounding said cylindrical portion of said second-mentioned member and separable from said open-ended member but having leakage-proof end contact therewith and also having a relatively thin end, a collar having an internal tapered surface, balls within said collar and arranged to bear against said tapered surface therein and the exterior of said relatively thin end of said sleeve and co-acting threads on said open-ended member and said collar whereby, when said collar is rotated to move same longitudinally by the action of said threads, said balls are rotated and moved around and along said internal tapered surface to the smaller diameter part thereof and are also rotated against said relatively thin end of said sleeve to contract said balls about said sleeve end and reduce the circumference thereof at the point of contact of said balls and to press said sleeve end into forcible contact with said cylindrical portion of said second-mentioned member to thereby hold said open-ended member and said second-mentioned member together and to render the joint between said open-ended member and said second-mentioned member tight against leakage.

3. A means for joining an open-ended member and a member having a cylindrical portion adapted to enter said open-ended member, comprising a collar having an internal tapered surface, balls within said collar and arranged to bear against said tapered surface therein and said cylindrical portion of said second-mentioned member and co-acting threads on said open-ended member and said collar whereby, when said collar is rotated to move same longitudinally by the action of said threads, said balls are rotated and moved around and along said tapered surface to the smaller diameter thereof, and are also rotated around said cylindrical portion of said second-mentioned member to contract said balls about said portion and reduce the circumference of said portion at the contact point of said balls, and means for re-assembling said parts and for retaining said parts in position after the removal of said balls comprising a ring member adapted to engage the portion of said second-mentioned member having said reduced circumference and to be held therein by the said threaded collar.

4. A means for joining an open-ended member to a second member having a cylindrical portion adapted to enter said open-ended member, comprising a collar having an internal tapered surface, balls within said collar and arranged to bear against said tapered surface therein and said cylindrical portion of said second-mentioned member and co-acting threads on said open-ended member and said collar whereby, when said collar is rotated to move the same longitudinally by the action of said threads, said balls are rotated and moved around and along said tapered surface to the smaller diameter thereof and are also rotated around said cylindrical portion of said second-mentioned member to contract said balls about said portion and reduce the circumference thereof at the contact point of said balls, a packing means within said open end of said open-ended member and between said member and said cylindrical portion of said second-mentioned member, and means whereby said packing is compressed by the rotation of said collar independently of the pressure of the collar against said balls.

5. A means for joining an open-ended member and a member having a cylindrical portion, comprising a collar having an internal tapered surface, balls within said collar and arranged to bear against said tapered surface therein and said cylindrical portion of said second-mentioned member and coacting threads on said open-ended member and said collar whereby, when said collar is rotated to move the same longitudinally by the action of said threads, said balls are rotated and moved around and along said tapered surface to the smaller diameter thereof and are also rotated around said cylindrical portion of said second-mentioned member to contract said balls about said portion and reduce the circumference thereof at said contact point of said balls, and means for preventing leakage between said open-ended member and said second-mentioned member comprising a packing means within the open end of said open-ended member and between said member and said cylindrical portion of said second-mentioned member, and a pressure ring for said packing and adapted to contact with said collar whereby the said longitudinal movement of said collar is directly transmitted to said ring to move said ring forcibly against said packing independently of the pressure of said collar upon said balls.

ALDEN E. OSBORN.